US011403120B1

(12) United States Patent
Vanderzee et al.

(10) Patent No.: US 11,403,120 B1
(45) Date of Patent: Aug. 2, 2022

(54) ENTERPRISE PROCESS GRAPHS FOR REPRESENTING RPA DATA

(71) Applicant: UiPath, Inc., New York, NY (US)

(72) Inventors: Matthew Vanderzee, Sammamish, WA (US); Roeland Augustinus Maria Vliegen, Waalre (NL); Ilarie Letca, Redmond, WA (US); Virgil Artimon Palanciuc, Bucharest (RO)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/159,190

(22) Filed: Jan. 27, 2021

(51) Int. Cl.
*G06F 3/048* (2013.01)
*G06F 9/451* (2018.01)
*G06F 16/901* (2019.01)

(52) U.S. Cl.
CPC .......... *G06F 9/451* (2018.02); *G06F 16/9024* (2019.01)

(58) Field of Classification Search
None
See application file for complete search history.

(56) References Cited

U.S. PATENT DOCUMENTS

| | | | |
|---|---|---|---|
| 8,619,084 B2 | 12/2013 | Curbera et al. | |
| 9,053,437 B2 | 6/2015 | Adler et al. | |
| 10,339,027 B2 | 7/2019 | Garcia et al. | |
| 2016/0292303 A1* | 10/2016 | Hong | G06F 16/9024 |
| 2017/0213167 A1 | 7/2017 | Rinke et al. | |
| 2019/0180746 A1 | 6/2019 | Diwan et al. | |
| 2020/0050983 A1* | 2/2020 | Balasubramanian | G06F 11/3423 |
| 2020/0206920 A1* | 7/2020 | Ma | G06K 9/6223 |
| 2020/0234183 A1 | 7/2020 | Ghatage et al. | |
| 2020/0327125 A1 | 10/2020 | Rosik et al. | |
| 2021/0158268 A1* | 5/2021 | Berg | G06Q 10/063116 |

FOREIGN PATENT DOCUMENTS

| | | |
|---|---|---|
| IN | 201841032794 A | 9/2019 |
| IN | 201921026057 A | 7/2020 |
| KR | 10-2020-0003692 A | 1/2020 |

OTHER PUBLICATIONS

Parmar et al., "Building an Organizational Digital Twin," 2020, Business Horizons, vol. 63, Issue 6, pp. 725-736.
International Search Report and Written Opinion dated Feb. 18, 2022, in connection with International Patent Application No. PCT/US2021/072047, filed Oct. 26, 2021, 10 pgs.

* cited by examiner

*Primary Examiner* — William C Trapanese
(74) *Attorney, Agent, or Firm* — Chiesa Shahinian & Giantomasi PC (57) ABSTRACT

Systems and methods for generating an enterprise process graph are provided. Sets of process data relating to an implementation of RPA (robotic process automation) acquired using a plurality of discovery techniques is received. An enterprise process graph representing the implementation of RPA is generated based on the received sets of process data.

23 Claims, 11 Drawing Sheets

| Case ID | Activity | Time Stamp | Process ID |
|---|---|---|---|
| 1 | Activity A | 01/01/2020 10:00:00 | 1 |
| 1 | Activity B | 01/01/2020 10:00:02 | 1 |
| 1 | Activity C | 01/01/2020 10:00:12 | 1 |
| 2 | Activity A | 01/01/2020 10:04:32 | 1 |
| 2 | Activity C | 01/01/2020 10:04:56 | 1 |
| 3 | Activity D | 01/01/2020 10:05:18 | 1 |
| 4 | Activity D | 01/01/2020 10:07:11 | 1 |
| 4 | Acitvity A | 01/01/2020 10:07:31 | 1 |
| 4 | Activity D | 01/01/2020 10:07:46 | 1 |
| 1 | Activity D | 01/01/2020 10:25:26 | 2 |
| 1 | Activity B | 01/01/2020 10:26:05 | 2 |
| 1 | Activity D | 01/01/2020 10:26:41 | 2 |
| 2 | Activity A | 01/01/2020 10:32:49 | 2 |
| 2 | Activity C | 01/01/2020 10:32:58 | 2 |
| 1 | Activity A | 01/01/2020 10:33:22 | 3 |
| 1 | Activity C | 01/01/2020 10:33:41 | 3 |

ENTERPRISE PROCESS GRAPHS FOR REPRESENTING RPA DATA

TECHNICAL FIELD

The present invention relates generally to RPA (robotic process automation), and more particularly to enterprise process graphs providing a unified representation of process data relating to an implementation of RPA acquired using a plurality of discovery techniques.

BACKGROUND

Processes are comprised of sequences of activities executed by one or more computers to provide various services. In RPA (robotic process automation), one or more RPA robots are implemented to automatically execute processes for an enterprise. Typically, data relating to the implementation of RPA is collected by performing a number of discovery techniques, such as, e.g., process mining, task mining, task capture, process discovery, etc. Conventionally, results of such techniques are individually analyzed to evaluate RPA. However, the individual analysis of the results of such techniques does not provide a unified understanding of the enterprise's processes as a whole.

BRIEF SUMMARY OF THE INVENTION

In accordance with one or more embodiments, systems and methods for generating an enterprise process graph are provided. Sets of process data relating to an implementation of RPA (robotic process automation) acquired using a plurality of discovery techniques is received. An enterprise process graph representing the implementation of RPA is generated based on the received sets of process data.

In one embodiment, the plurality of discovery techniques comprises at least one of process mining, process discovery, task mining, or task capture. In one embodiment, the at least one of process mining, process discovery, task mining, or task capture is performed.

In one embodiment, a set of one or more event tables is generated for each of the plurality of discovery techniques based on the received sets of process data. The enterprise process graph is generated based on the generated sets of the one or more event tables.

In one embodiment, the sets of the one or more event tables for each of the plurality of discovery techniques is generated by extracting a raw table from the received sets of process data and normalizing entries of the raw table.

In one embodiment, the enterprise process graph is generated by generating graphs for the generated sets of the one or more event tables and connecting two or more of the graphs. In one embodiment, the enterprise process graph is generated by generating an edge table based on the generated sets of the one or more event tables and generating the enterprise process graph based on the edge table.

In one embodiment, the enterprise process graph output by at least one of displaying, transmitting, or storing the enterprise process graph. In another embodiment, the enterprise process graph may be output by filtering the enterprise process graph and displaying the filtered enterprise process graph.

These and other advantages of the invention will be apparent to those of ordinary skill in the art by reference to the following detailed description and the accompanying drawings.

DETAILED DESCRIPTION

Figure 1:
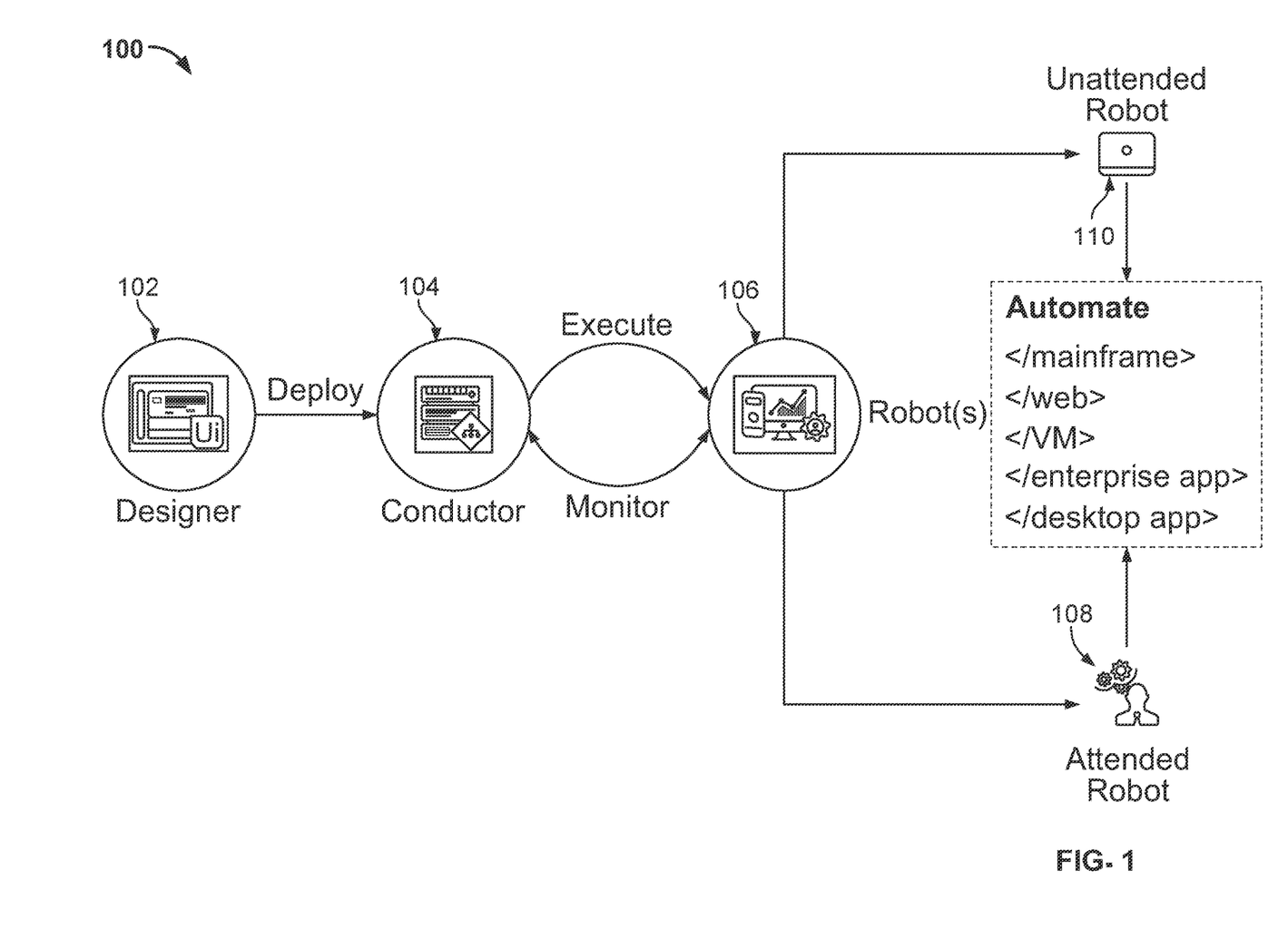
FIG. 1 is an architectural diagram illustrating a robotic process automation (RPA) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes by a user (e.g., an administrator). Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, deployment, and security of resources in an RPA environment. In one example, conductor 104 is a web application implemented by a cloud service. Conductor 104 may also function as an integration point with third-party solutions and applications.

Conductor 104 may manage a fleet of RPA robots 106 by connecting and executing robots 106 from a centralized set of points. Conductor 104 may have various capabilities including, but not limited to, provisioning, deployment, configuration, queueing, monitoring, logging, providing interconnectivity, scheduling, job management, eventing, credential management, audit operations, collection of audit data, package creation, and/or versioning of packages. Conductor 104 may also enable exposing events to external sources (e.g., web hooks). Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs and operational data to a database (e.g., relational and non-relational stores coupled with blob storages or queue mediums, such as an SQL or Elastic database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Other exemplary types of robots 106 include Studio, StudioX, TestAutomation, etc. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Both attended robots 108 and unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 can be installed by a persona or automatically installed either by other products or controller via policies (e.g., group policy object). In other embodiments, robots 106 can be installed via SYSPREP (system preparation) on an image, via a docker, or via Kubernetes. As a result, such robots 106 can open interactive Windows® sessions under the local system account, a local system, a local machine, etc., and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start, stop, pause, or resume jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
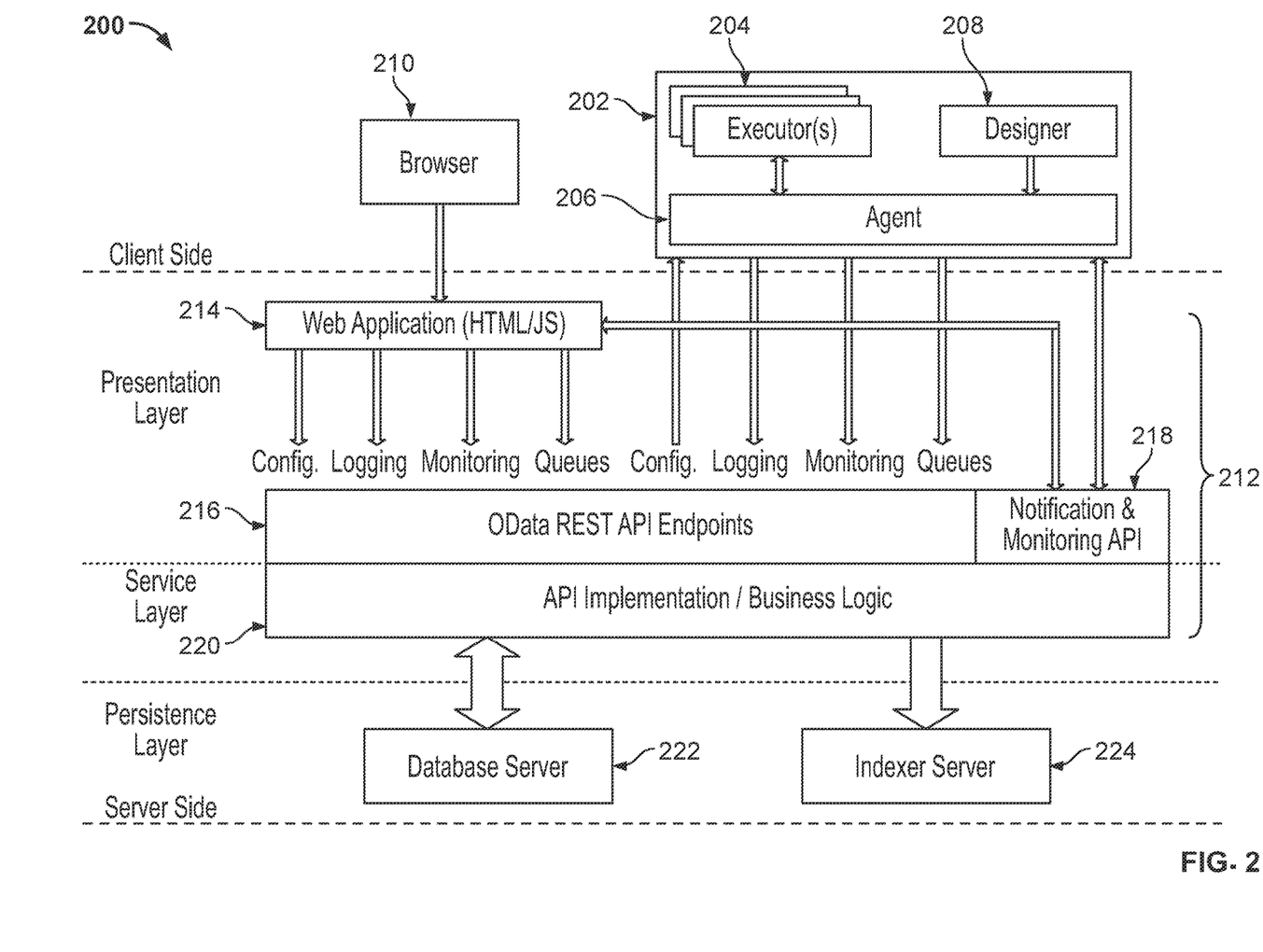
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2019), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, CRUD (create, read, update, delete) operations for processes, libraries, or jobs, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups (e.g., by folders), assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. The logging of different information may comprise logging system properties regarding the processes run by the robots and/or logging and collecting user specific parameter functions of job execution. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. Queues and queue items may also be managed by, e.g., a native queue service such as Kafka. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine, or Snowflake, which is a fully-managed data warehouse implemented in the cloud. Messages logged by robots (e.g., using activities like log message or write line) may be sent through the logging REST endpoint(s) to indexer server 224, where they are indexed for future utilization. The messages may be logged via real time log processing, near real time log processing, or offline log processing.

Figure 3:
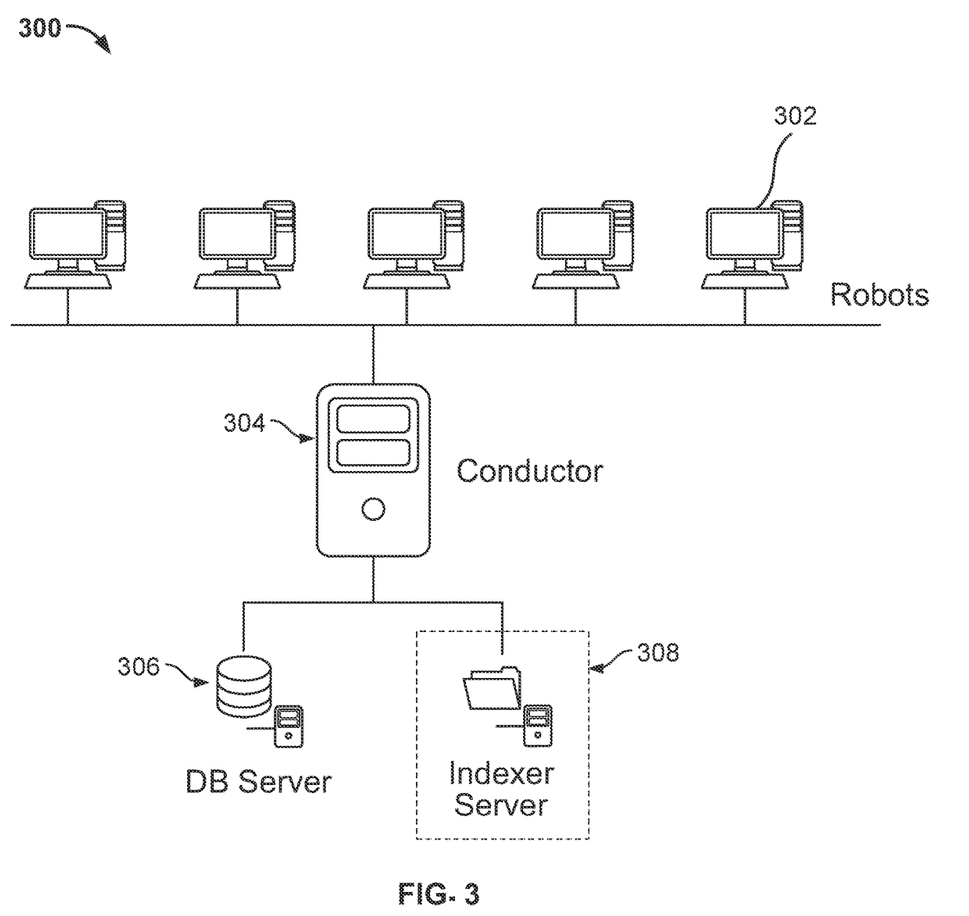
FIG. 3 is an architectural diagram illustrating a simplified deployment example of an RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application or a service (e.g., cloud service) is used in these embodiments, any suitable client/server software may be used without deviating from the scope of the invention. For instance, the conductor may run a server-side application that communicates with non-web-based client software applications on the client computing systems.

In one embodiment, RPA system 100 of FIG. 1, RPA system 200 of FIG. 2, and/or RPA system 300 of Figure may be implemented for cloud-based management of RPA robots. Such cloud-based management of RPA robots enables RPA to be provided as Software as a Service (SaaS). Accordingly, conductor 104 of FIG. 1, conductor 212 of FIG. 2, and/or conductor 304 of FIG. 3 is implemented in the cloud for cloud-based management of RPA robots to, e.g., create RPA robots, provision RPA robots, schedule tasks on RPA robots, decommission RPA robots, or effectuate any other orchestration task for managing RPA robots.

Figure 4:
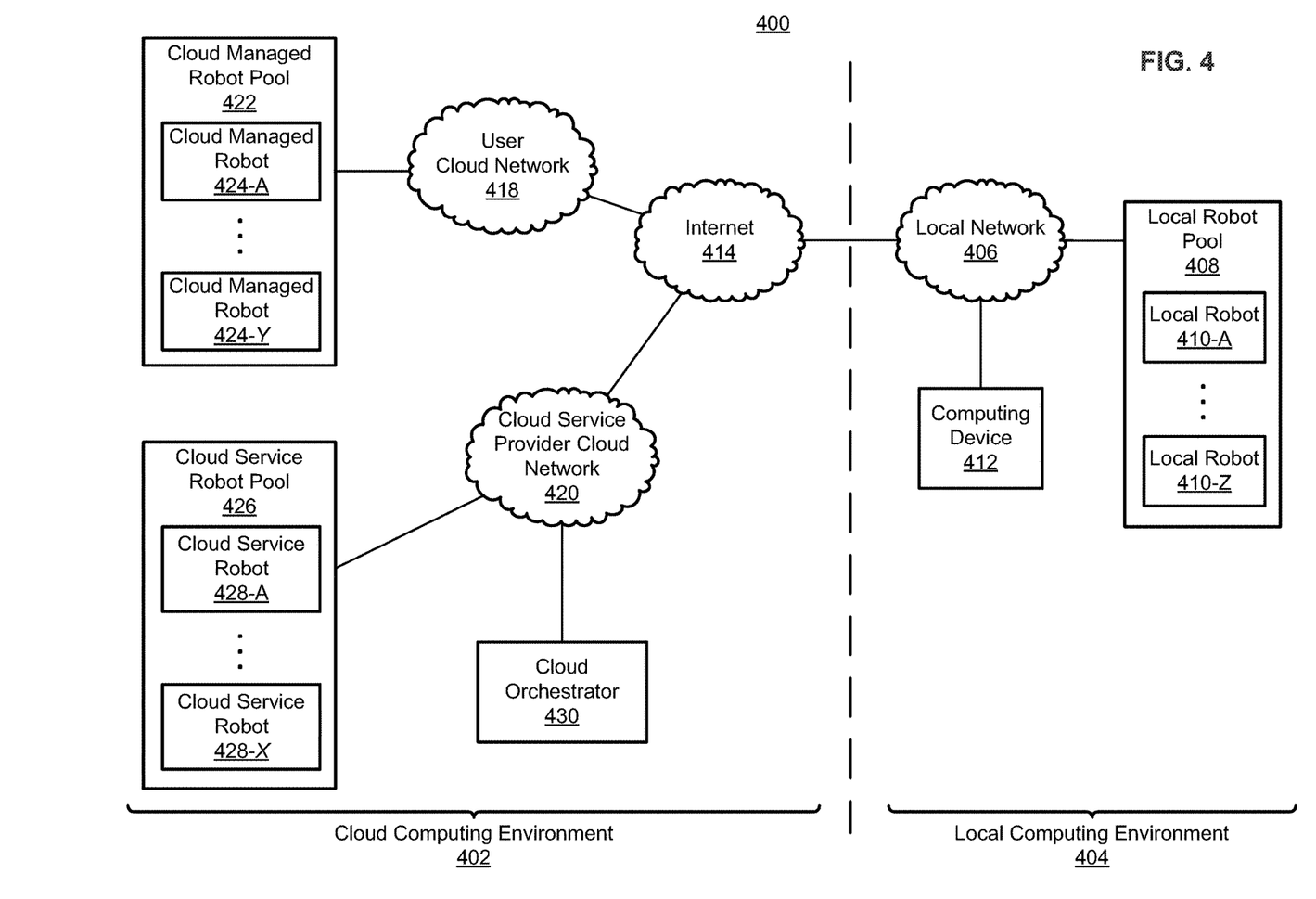
FIG. 4 shows an architecture diagram illustrating a cloud RPA system for implementing cloud-based management of robotic process automation robots, according to an embodiment of the invention.

FIG. 4 illustrates an architectural diagram of a cloud RPA system 400 for implementing cloud-based management of RPA robots, in accordance with one or more embodiments. Cloud RPA system 400 comprises a cloud computing environment 402 and a local computing environment 404. Local computing environment 404 represents a local network architecture of a user or any other entity or entities, such as, e.g., a company, a corporation, etc. Local computing environment 404 comprises local network 406. Cloud computing environment 402 represents a cloud computing network architecture that provides services or processing of workloads remote from the user at local computing environment 404. Cloud computing environment 402 comprises various cloud networks, including internet 414, user cloud network 418 representing a cloud network managed (or controlled) by the user and hosted by a cloud platform provider, and a cloud service provider cloud network 420 representing a cloud network managed by a cloud service provider and hosted by a cloud platform provider. The cloud service provider is an entity that provides services (e.g., RPA) via the cloud. The cloud platform provider is an entity that maintains cloud computing infrastructure. Local network 406 of local computing environment 404 is communicatively coupled to internet 414 of cloud computing environment 402 to facilitate communication between local computing environment 404 and cloud computing environment 402.

As shown in FIG. 4, a cloud orchestrator 430 is implemented in cloud computing environment 402 to enable cloud-based management of RPA robots. In particular, cloud orchestrator 430 is managed by a cloud service provider and hosted in cloud service provider cloud network 420 within cloud computing environment 402. In one embodiment, the cloud service provider provides RPA to the user in local computing environment 404.

Cloud orchestrator 430 manages RPA robots in cloud computing environment 402. In particular, the user interacts with computing device 412 in local computing environment 404 to transmit instructions for managing RPA robots to cloud orchestrator 430 in cloud computing environment 402. Alternatively, the user interacts with computing device 412 in local computing environment 404 to set a schedule on cloud orchestrator 430 to automatically transmit instructions and receive data on behalf of the user for managing RPA robots. Exemplary instructions for managing RPA robots include instructions for creating RPA robots, provisioning RPA robots, scheduling a task on RPA robots (e.g., schedule a time for performing the task and a type of robot to perform the task), decommissioning RPA robots, or any other orchestration instructions for RPA robots. In response to receiving the instructions, cloud orchestrator 430 effectuates the instructions by, e.g., creating the RPA robots, provisioning the RPA robots, scheduling the task of the RPA robot, decommissioning the RPA robots, etc. In one embodiment, cloud orchestrator 430 may be similar to conductor 104 of FIG. 1, conductor 212 of FIG. 2, or conductor 304 of FIG. 3, but implemented in cloud service provider cloud network 420 within cloud computing environment 402.

The RPA robots managed by cloud orchestrator 430 may include a dynamic pool of cloud robots that are deployed and maintained within cloud computing environment 402. Such cloud robots may include one or more cloud service robots 428-A, . . . , 428-X (hereinafter collectively referred to as cloud service robots 428) of cloud service robot pool 426 and one or more cloud managed robots 424-A, . . . , 424-Y (hereinafter collectively referred to as cloud managed robots 424) of cloud managed robot pool 422. Such cloud robots perform (i.e., process) tasks in cloud computing environment 402 and transmit results of the tasks to the user in local computing environment 404. Additionally or alternatively, the RPA robots managed by cloud orchestrator 430 may include zero or more, and by and large many, local robots 410-A, . . . , 410-Z (hereinafter collectively referred to as local robots 410) of local robot pool 408. In some embodiments, cloud orchestrator 430 may itself act as a robot for performing service side workflows.

Cloud service robots 428 are maintained by the cloud service provider in cloud service provider cloud network 420 for performing RPA tasks in cloud computing environment 402 for the user in local network environment 404. Cloud service robots 428 are created upon request by the user sending instructions from computing device 412 to cloud orchestrator 430. Upon creation, cloud service robots 428 wait for tasks to be executed, either by polling or being notified of new tasks. While waiting, the cost for running the cloud service robots 428 is minimized or otherwise reduced. Tasks are scheduled on cloud service robots 428 by the user sending instructions from computing device 412 to cloud orchestrator 430. The instructions for scheduling tasks defines the time for performing the task and a type of robot for performing the task. Cloud orchestrator 430 optimizes task scheduling and execution function for a variety of factors. Cloud service robots 428 wake up from the waiting status to perform the task and return to the waiting status once the task is complete. Accordingly, cloud service robots 428 perform the tasks on cloud service provider cloud network 420 for the user in local computing environment 404.

Cloud managed robots 424 are maintained by the user in a user cloud network 418 for performing RPA tasks in cloud computing environment 402 for the user in local network environment 404. Cloud managed robots 424 are similar in capability to cloud service robots 428 and are also hosted in cloud computing environment 402. However, user cloud network 418, upon which cloud managed robots 424 are hosted, is managed by the user while cloud service provider cloud network 420, upon which cloud service robots 428 are hosted, is managed by the cloud service provider and hosted by the cloud platform provider. Cloud orchestrator 430 manages cloud managed robots 424 by establishing a connection between cloud service provider cloud network 420 and user cloud network 418. User cloud network 418 may be established by the user utilizing cloud provider technology to tunnel back to local network 406. The user can establish a dedicated network connection from local network 406 to cloud service provider cloud network 420. Connectivity is typically in the form of, e.g., an any-to-any (e.g., internet protocol virtual private network) network, a point-to-point Ethernet network, or a virtual cross-connection through a connectivity provider at a co-location facility. These connections do not go over the public Internet. This offers more reliability, faster speeds, consistent latencies, and higher security than typical connections over the Internet. User cloud network 418 continues to be fully controlled and managed by the user, thereby providing stringent control over data to the user.

Once the connection between cloud service provider cloud network 420 and user cloud network 418 has been established, cloud managed robots 424 are created upon request by the user interacting with cloud orchestrator 430 via computing device 412. Cloud managed robots 424 are created on user cloud network 418. Accordingly, cloud managed robots 424 perform the tasks on user cloud network 418 for the user in local computing environment 404. Algorithms may be applied to maximize the utilization of the robots in cloud managed robot pool 422 and to reduce operating costs for the user.

Local robots 410 are maintained by the user in local network 406 for performing RPA tasks for the user in local network environment 404. Local network 406 is controlled or otherwise managed by the user. Cloud Orchestrator 430 maintains a connection to local robots 410 through standard HTTPS connectivity.

Embodiments described herein provide for the generation of enterprise process graphs to provide a unified understanding of process data representing an implementation of RPA, such as, e.g., RPA implemented according to RPA system 100 of FIG. 1, RPA system 200 of FIG. 2, RPA system 300 of FIG. 3, and/or cloud RPA system 400 of FIG. 4. An enterprise process graph is a graph (e.g., a directed graph) where activities or tasks of a process are represented as nodes and each transition between activities or tasks are represented as edges connecting the nodes. An enterprise process graph is also known as a work graph. Such enterprise process graphs provide for a unified understanding of process data collected for an RPA implementation by performing a plurality of different discovery techniques, such as, e.g., process mining, task mining, task capture, and/or process discovery. Advantageously, such enterprise process graphs combine the process data such that the combined process data is represented in a meaningful way to facilitate user understanding of the overall RPA implementation and enable computer techniques to simplify and automate RPA implementation and management. It should be understood that while the enterprise process graph is described herein for the representation of process data relating to an implementation of RPA, the present invention is not so limited. The enterprise process graph may be generated for represented any type of data and is not limited to RPA data.

Figure 5:
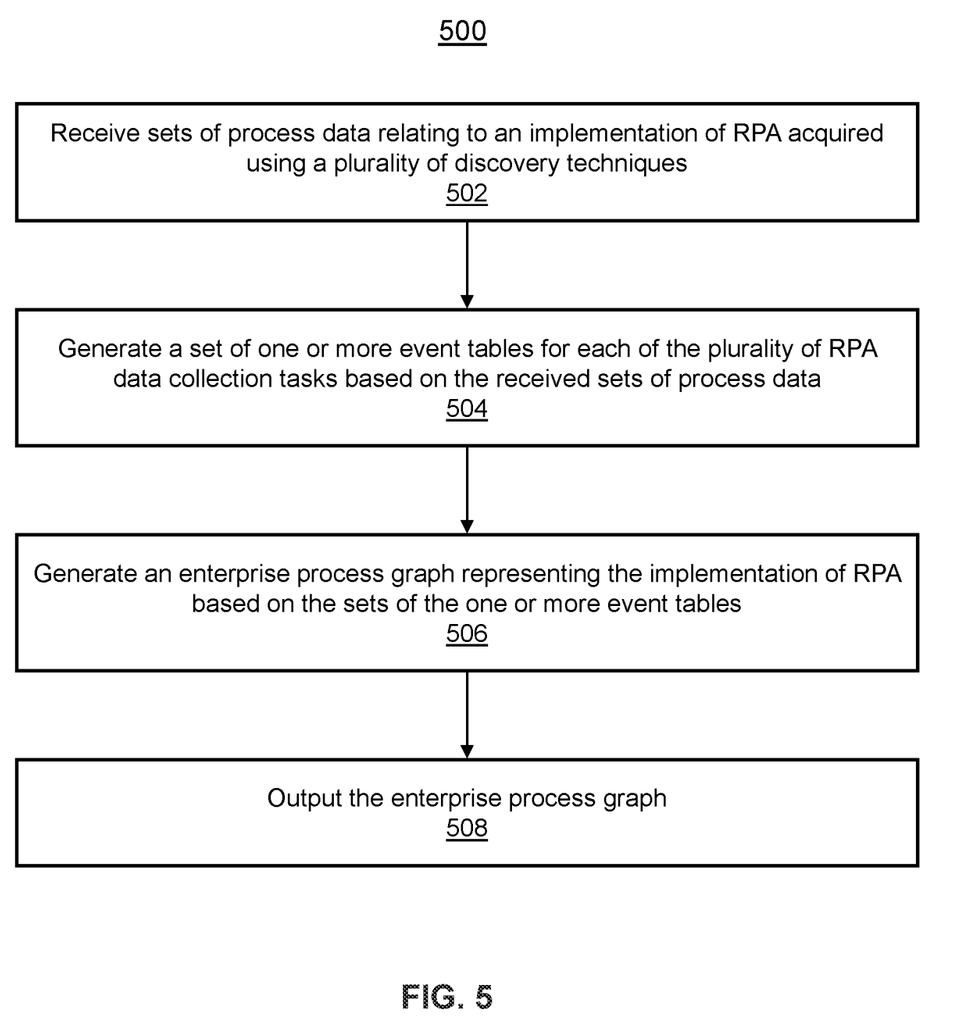
FIG. 5 shows a method for generating an enterprise process graph, according to an embodiment of the invention.

FIG. 5 shows a method 500 for generating an enterprise process graph, in accordance with one or more embodiments. The steps of method 500 may be performed by one or more suitable computing devices, such as, e.g., computing system 1000 of FIG. 10.

At step 502, sets of process data relating to an implementation of RPA acquired using a plurality of discovery techniques is received. The implementation of RPA may be for an enterprise, such as, e.g., a user, an organization, a company, or any other entity.

The discovery techniques may include any technique for directly or indirectly inferring relationships between process activities or tasks. In one embodiment, the discovery techniques may include process mining, task mining, process discovery, and task capture. As used herein, process mining refers to the automatic identification of RPA processes by monitoring enterprise systems for tracking relationships between RPA events. Process discovery (also referred to as process capture or process modeling) refers to designing enterprise processes based on user input (e.g., explicit user input or inferred user activity). Task mining refers to the automatic identification of RPA tasks by observing (e.g., real time or near real time monitoring or offline analysis) user input (e.g., explicit user input or inferred user activity) on applications. Task capture refers to the identification of tasks based on user input. In one embodiment, at least one of process mining, task mining, process discovery, or task capture is performed. It should be understood that the discovery techniques may include any suitable approach for collecting process data relating to an implementation of RPA and is not limited to process mining, task mining, process discovery, and task capture.

At step 504, a set of one or more event tables are generated for each of the plurality of discovery techniques based on the received sets of process data. It should be understood that an event table as used herein is any representation of the relationship between data and is not limited to a table. In one embodiment, the event table is generated according to workflow 600 of FIG. 6.

Figure 6:
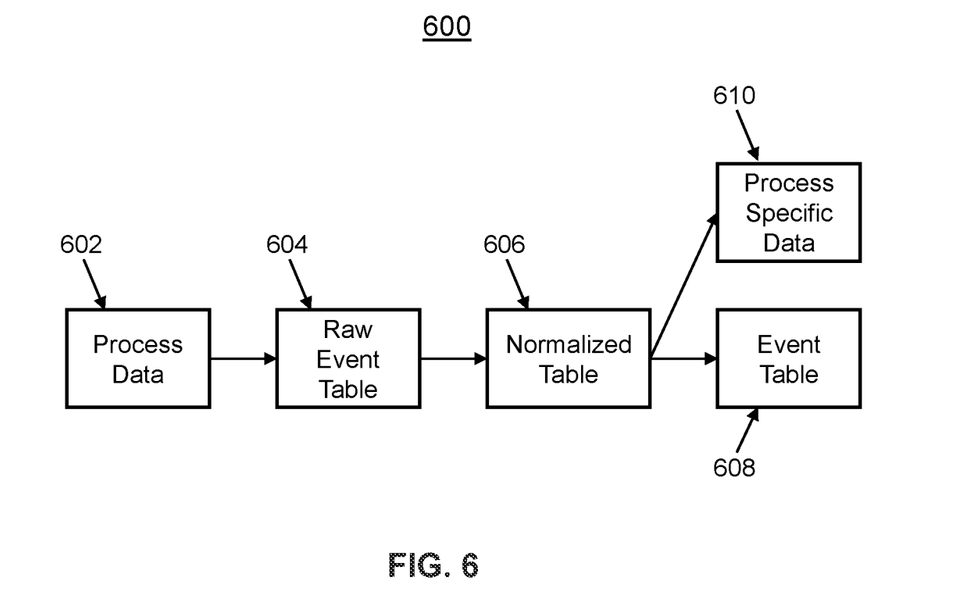
FIG. 6 shows a workflow for generating an event table for a particular discovery technique, according to an embodiment of the invention.

FIG. 6 shows a workflow 600 for generating an event table for a particular discovery technique, in accordance with one or more embodiments. Process data 602 represents a set of process data acquired using the particular discovery technique. Raw table 604 is extracted from process data 602. Raw table 604 is a table of RPA related events. For example, for process mining and process discovery, the RPA related events may represent the execution of an activity of a process at a particular time and at a particular instance of execution of the process. In another example, for task mining and task capture, the RPA related events may be a recorded step at a user's desktop, which may be accompanied by a screenshot of the step. The recorded step may be recorded using an automatic continuous recorder (e.g., in task mining) or on request of a user or triggered by a system or activity (e.g., in task capture). Raw table 604 may be extracted using any suitable approach, such as, e.g., an ODBC (open database connectivity) extractor, a text extractor, an SAP extractor, etc. In one embodiment, entries of raw table 604 are normalized to generate normalized table 606. Raw table 604 is normalized to make sure all tables are in the same schema so they can be handled uniformly from that point. This includes, e.g., renaming columns, calculations to make sure that all numbers are comparable (e.g., converting everything to the same currency), combining or splitting tables to make them conform to the normalized model, etc. Normalized table 606 is output as event table 608, along with process specific data 610. Process specific data 610 refers data relating to a process other than event data. In one example, event table 608 is event table 700 of FIG. 7.

Figure 7:
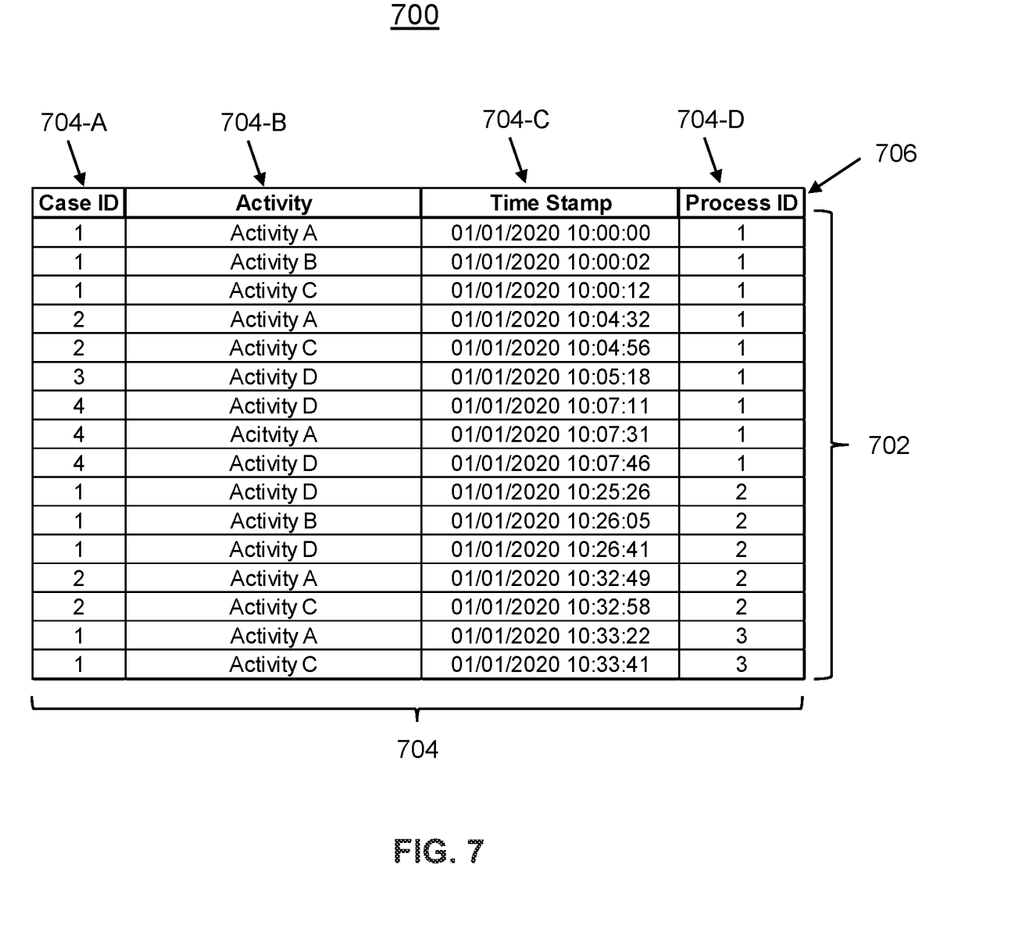
FIG. 7 shows an exemplary event table for one or more processes, in accordance with an embodiment of the invention.

FIG. 7 shows an exemplary event table 700 for one or more processes, in accordance with one or more embodiments. Event table 700 records events occurring during one or more instances of execution of three processes, corresponding to process ID 1 through process ID 3 in event table 700. As shown in FIG. 7, event table 700 is formatted as a table having rows 702 each corresponding to an event and columns 704 each identifying an attribute of the event, identified in header row 706, at a cell at which rows 702 and columns 704 intersect. In particular, each row 702 is associated with an event representing the execution of an activity of a process (identified in column 704-B), a time stamp of the execution of the activity (identified in column 704-C), a case ID identifying the instance of execution of the executed a particular process for the activity (identified in column 704-A), and a process ID identifying the process of the executed activity. It should be understood that event table 700 may be in any suitable format and may include additional columns 704 identifying other attributes of events.

At step 506 of FIG. 5, an enterprise process graph representing the implementation of RPA is generated based on the sets of one or more event tables. Conceptually, the generation of the enterprise process graph can be thought of as follows. A set of disconnected graphs can be created from the event tables. The enterprise process graph can be created by adding edges to the set of disconnected graphs to connect the graphs (at least in part). The newly added edges do not necessarily correspond to cases that traverse them. In one embodiment, the enterprise process graph is created according to workflow 800 of FIG. 8.

Figure 8:
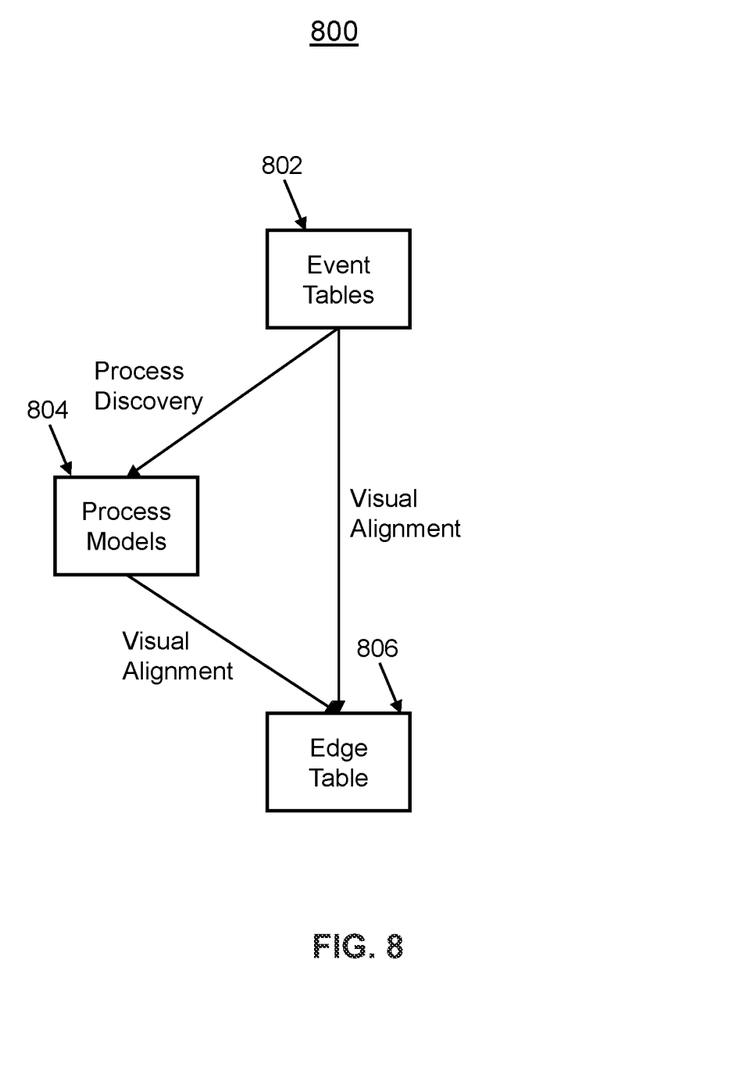
FIG. 8 shows a workflow for generating an edge table representing an enterprise process graph, in accordance with an embodiment of the invention.

FIG. 8 shows a workflow 800 for generating an edge table representing an enterprise process graph, in accordance with one or more embodiments. In workflow 800, event tables 802 may be the event tables generated at step 504 of FIG. 5. Event tables 802 represents RPA event data for data acquired using the plurality of discovery techniques. In one embodiment, an edge table 806 is generated from event tables 802. Edge table 806 may be generated using any suitable technique (e.g., artificial intelligence or machine learning based techniques, supervised learning, etc.) for identifying relationships between event tables 802. In one embodiment, edge table 806 may be generated according to methods described in U.S. Patent Application Publication No. 2021/0200758, filed Dec. 27, 2019, the disclosure of which is incorporated herein by reference in its entirety. Edge table 806 is a table encoding the relationship between events in event tables 802. The enterprise process graph is then generated from edge table 806. In another embodiment, process models 804 are generated from event tables 802 (e.g., using process discovery techniques) and edge table 806 is generated from process models 804 using any suitable technique (e.g., artificial intelligence or machine learning based techniques, supervised learning, etc.) for identifying relationships between process models 804. An illustrative edge table is shown in FIG. 9.

Figure 9:
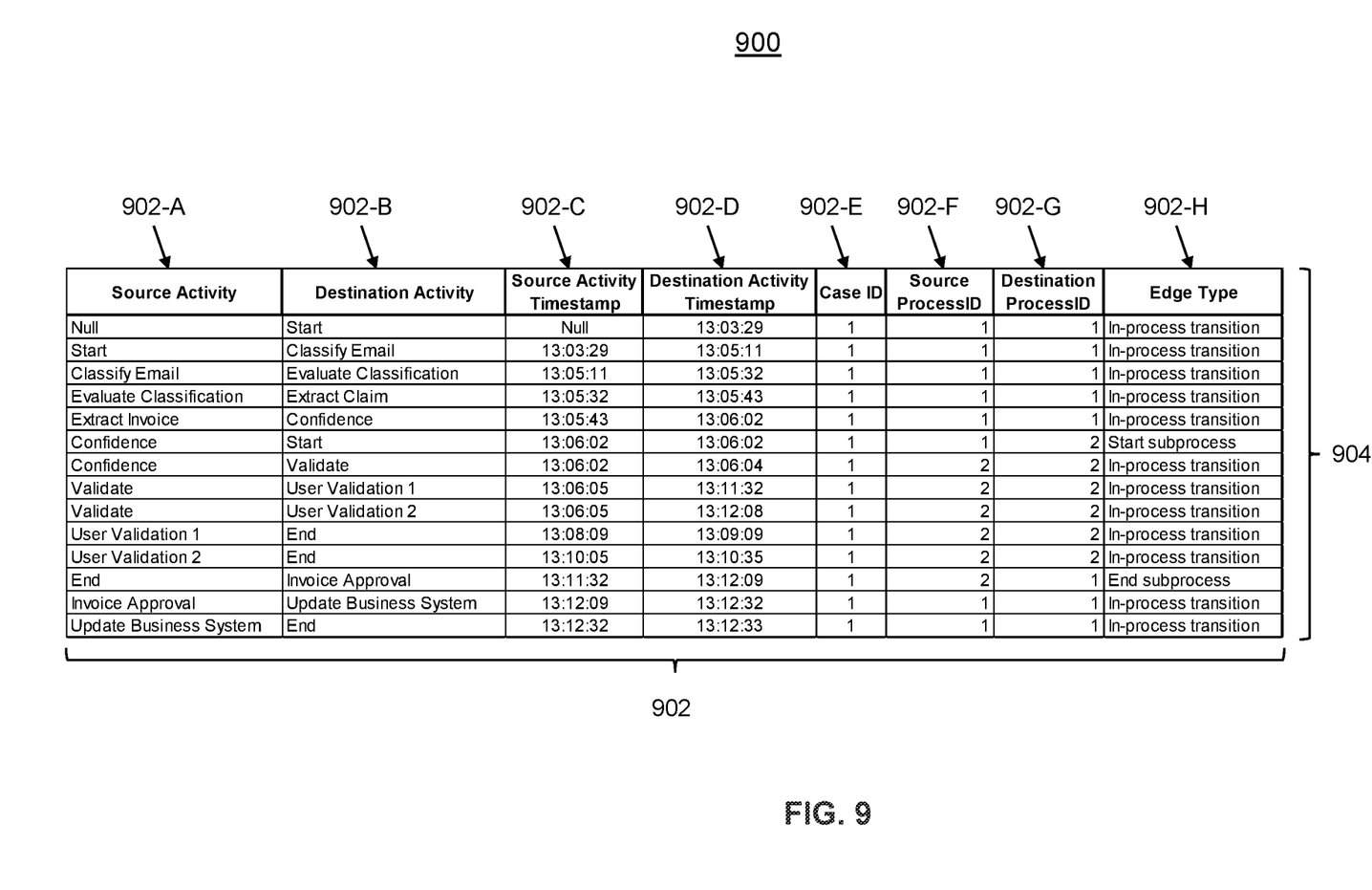
FIG. 9 shows an illustrative edge table, in accordance with one or more embodiments

FIG. 9 shows an illustrative edge table 900, in accordance with one or more embodiments. In one example, edge table 900 is edge table 806 of FIG. 8. Edge table 900 includes columns 902 and rows 904. Each row 904 in edge table 900 identifies a transition from a source event to a destination event. Each column 902 in edge table 900 is associated with a field identifying various attributes of the source event and the destination event for each row 904. For example, column 902-A identifies a source activity, column 902-B identifies a destination activity, column 902-C identifies a source activity timestamp, column 902-D identifies a destination activity timestamp, column 902-E identifies a case ID, column 902-F identifies a source process ID representing the process ID of the process of the source activity, column 902-G identifies a destination process ID representing the process ID of the process of the destination activity, and column 902-H identifies an edge type. Edge table 900 may include additional columns 302 identifying additional attributes, such as, e.g., names or service level agreements.

At step 508 of FIG. 5, the enterprise process graph is output. In one embodiment, the enterprise process graph may be output by, for example, displaying the enterprise process graph on a display device of a device, storing the enterprise process graph on a memory or storage of a computer system, or by transmitting the enterprise process graph to a remote computer system or service (e.g., an email service, a reporting server, etc.). The storage of the enterprise process graph may enable viewing the history or evolution of the enterprise process graph over time. In one embodiment, the enterprise process graph may be displayed according to workflow 1000 of FIG. 10.

Figure 10:
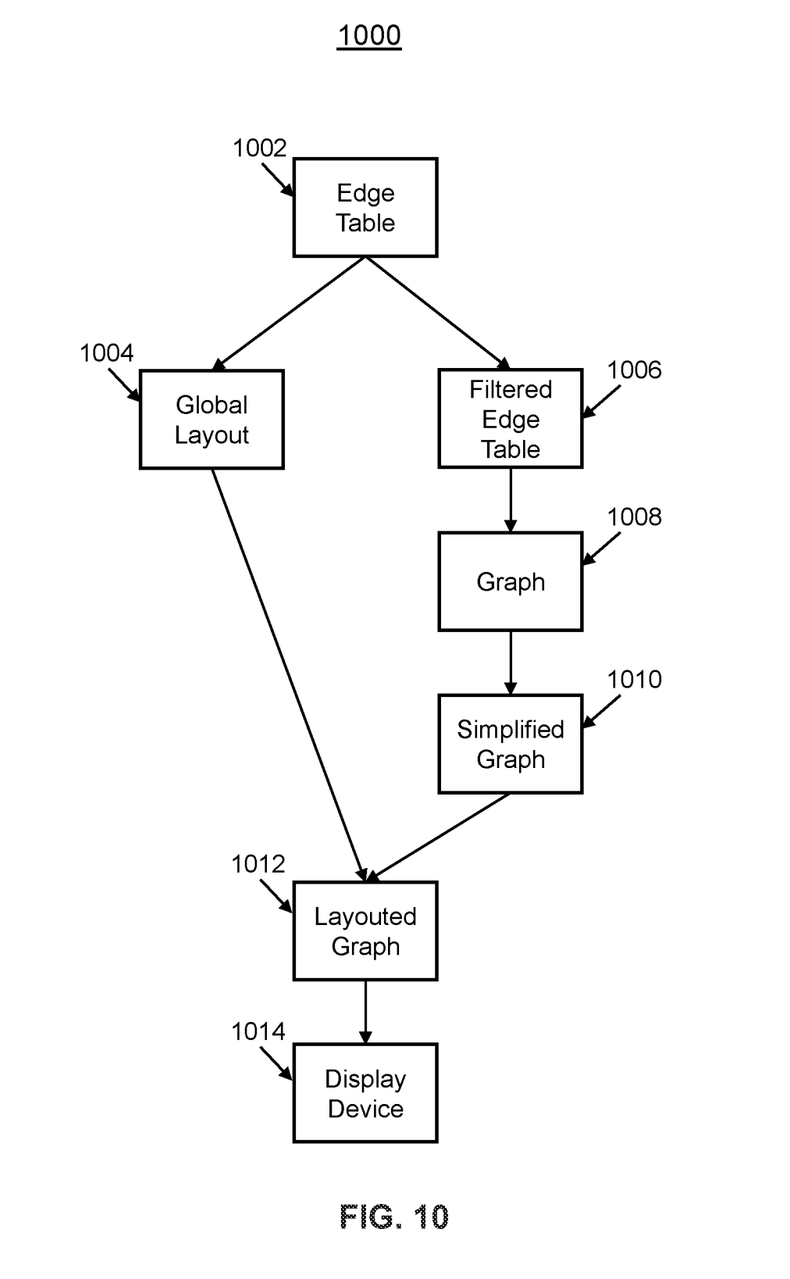
FIG. 10 shows a workflow for displaying an enterprise process graph, in accordance with an embodiment of the invention.

FIG. 10 shows a workflow 1000 for displaying an enterprise process graph, in accordance with one or more embodiments. In workflow 1000, edge table 1002 may be the edge table generated during step 506 of FIG. 5. In one embodiment, edge table 1002 is formatted according to a global layout 1004 to generate layouted graph 1012, which is then rendered for display on display device 1014 (e.g., display 1110 of FIG. 11). In another embodiment, edge table 1002 is filtered to generate filtered edge table 1006. Edge table 1002 may be filtered based on, e.g., case filters, edge filters lifted to case level, process filters lifted to case level, or any other suitable filter. Graph 1008 is then generated from filtered edge table 1006, which can also show various metrics. A simplified graph 1010 is generated from graph 1008. Simplified graph 1010 may be generated by applying a visual complexity slider to graph 1008 to filter edges and nodes of graph 1008 based on a user defined or automatically defined level of complexity, by applying a from-to filter to filter out edges based on a from node and to node, by drilling up/down on graph 1006, or by applying any other suitable approach for simplifying graph 1008. Simplified graph 1010 is then formatted as layouted graph 1012, which is then rendered for display on display device 1014.

Figure 11:
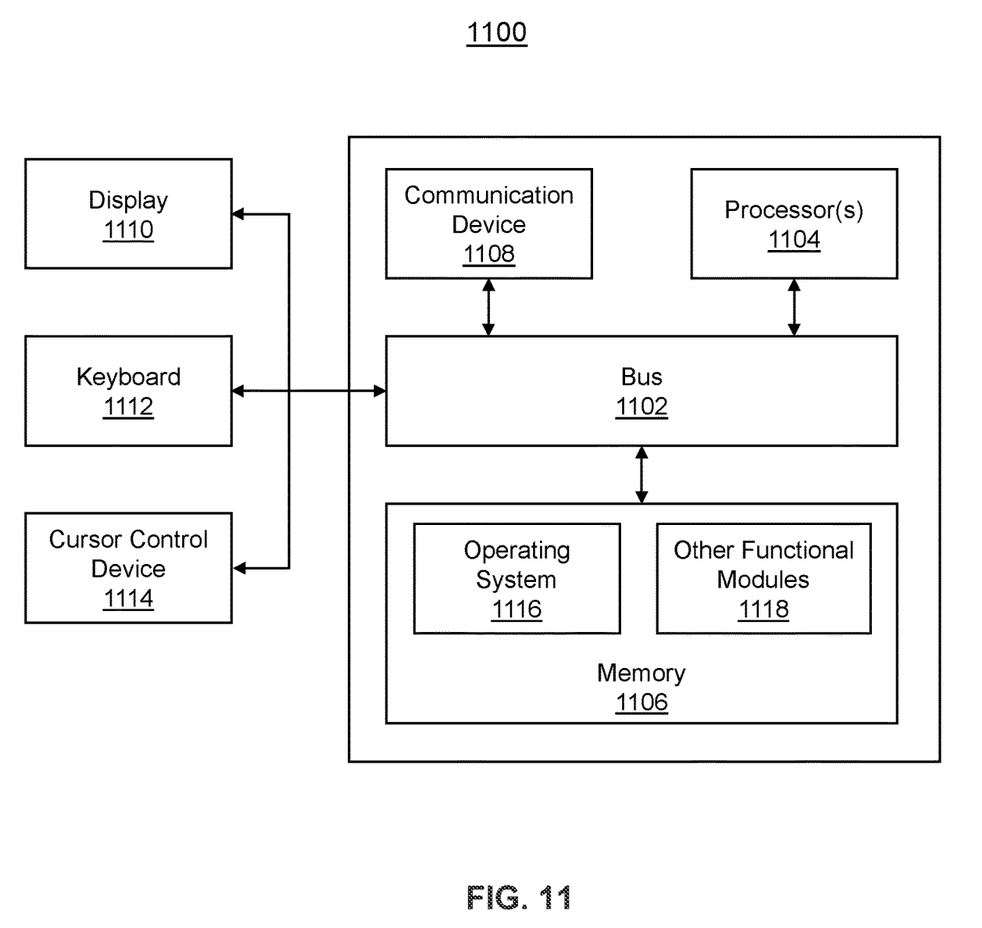
FIG. 11 is a block diagram of a computing system, which may be used to implemented embodiments of the invention.

FIG. 11 is a block diagram illustrating a computing system 1100 configured to execute the methods, workflows, and processes described herein, including method 500 of FIG. 5, workflow 600 of FIG. 6, workflow 800 of FIG. 8, and workflow 1000 of FIG. 10, according to an embodiment of the present invention. In some embodiments, computing system 1100 may be one or more of the computing systems depicted and/or described herein. Computing system 1100 includes a communication medium 1102 such as, e.g., a bus or other communication mechanism for communicating information, and processor(s) 1104 coupled to communication medium 1102 for processing information. Processor(s) 1104 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1104 may also have multiple processing cores, and at least some of the cores may be configured to perform specific functions. Multi-parallel processing may be used in some embodiments.

Computing system 1100 further includes a memory 1106 for storing information and instructions to be executed by processor(s) 1104. Memory 1106 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1104 and may include volatile media, non-volatile media, or both. The media may also be removable, non-removable, or both.

Additionally, computing system 1100 includes a communication device 1108, such as a transceiver, to provide access to a communications network via a wireless and/or wired connection according to any currently existing or future-implemented communications standard and/or protocol.

Processor(s) 1104 are further coupled via communication medium 1102 to a display 1110 that is suitable for displaying information to a user. Display 1110 may also be configured as a touch display and/or any suitable haptic I/O device.

A keyboard 1112 and a cursor control device 1114, such as a computer mouse, a touchpad, etc., are further coupled to communication medium 1102 to enable a user to interface with computing system. However, in certain embodiments, a physical keyboard and mouse may not be present, and the user may interact with the device solely through display 1110 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1106 stores software modules that provide functionality when executed by processor(s) 1104. The modules include an operating system 1116 for computing system 1100 and one or more additional functional modules 1118 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer implemented method comprising:
   receiving sets of process data relating to an implementation of RPA (robotic process automation) each acquired using a different one of a plurality of discovery techniques for inferring relationships between activities or tasks;
   generating a set of one or more event tables of RPA related events for each of the different ones of the plurality of discovery techniques based on the received sets of process data;
   generating an enterprise process graph representing the implementation of RPA based on the sets of the one or more event tables;
   storing the enterprise process graph in memory; and
   displaying, on a display device, a history of the enterprise process graph over time based on the storing of the enterprise process graph in the memory.

2. The computer implemented method of claim 1, wherein the plurality of discovery techniques comprises at least one of process mining, process discovery, task mining, or task capture.

3. The computer implemented method of claim 2, further comprising:
   performing the at least one of process mining, process discovery, task mining, or task capture.

4. The computer implemented method of claim 1, wherein generating a set of one or more event tables for each of the different ones of the plurality of discovery techniques based on the received sets of process data comprises:
   extracting a raw table from the received sets of process data.

5. The computer implemented method of claim 4, wherein generating a set of one or more event tables for each of the different ones of the plurality of discovery techniques based on the received sets of process data comprises:
   normalizing entries of the raw table.

6. The computer implemented method of claim 1, wherein generating an enterprise process graph representing the implementation of RPA based on the sets of the one or more event tables comprises:
   generating graphs for the sets of the one or more event tables.

7. The computer implemented method of claim 6, wherein generating an enterprise process graph representing the implementation of RPA based on the sets of the one or more event tables comprises:
   connecting two or more of the graphs.

8. The computer implemented method of claim 1, wherein generating an enterprise process graph representing the implementation of RPA based on the sets of the one or more event tables comprises:
   generating an edge table based on the sets of the one or more event tables; and
   generating the enterprise process graph based on the edge table.

9. The computer implemented method of claim 1, further comprising:
   transmitting the enterprise process graph.

10. The computer implemented method of claim 1, further comprising:
    filtering the enterprise process graph.

11. The computer implemented method of claim 10, further comprising:
   displaying the filtered enterprise process graph.

12. An apparatus comprising:
   a memory storing computer instructions; and
   at least one processor configured to execute the computer instructions, the computer instructions configured to cause the at least one processor to perform operations of:
   receiving sets of process data relating to an implementation of RPA (robotic process automation) each acquired using a different one of a plurality of discovery techniques for inferring relationships between activities or tasks;
   generating a set of one or more event tables of RPA related events for each of the different ones of the plurality of discovery techniques based on the received sets of process data;
   generating an enterprise process graph representing the implementation of RPA based on the sets of the one or more event tables;
   storing the enterprise process graph in memory; and
   displaying, on a display device, a history of the enterprise process graph over time based on the storing of the enterprise process graph in the memory.

13. The apparatus of claim 12, wherein the plurality of discovery techniques comprises at least one of process mining, process discovery, task mining, or task capture.

14. The apparatus of claim 13, the operations further comprising:
   performing the at least one of process mining, process discovery, task mining, or task capture.

15. The apparatus of claim 12, wherein generating a set of one or more event tables for each of the different ones of the plurality of discovery techniques based on the received sets of process data comprises:
   extracting a raw table from the received sets of process data.

16. The apparatus of claim 15, wherein generating a set of one or more event tables for each of the different ones of the plurality of discovery techniques based on the received sets of process data comprises:
   normalizing entries of the raw table.

17. A non-transitory computer-readable medium storing computer program instructions, the computer program instructions, when executed by at least one processor, cause the at least one processor to perform operations comprising:
   receiving sets of process data relating to an implementation of RPA (robotic process automation) each acquired using a different one of a plurality of discovery techniques for inferring relationships between activities or tasks;
   generating a set of one or more event tables of RPA related events for each of the different ones of the plurality of discovery techniques based on the received sets of process data;
   generating an enterprise process graph representing the implementation of RPA based on the sets of the one or more event tables;
   storing the enterprise process graph in memory; and
   displaying, on a display device, a history of the enterprise process graph over time based on the storing of the enterprise process graph in the memory.

18. The non-transitory computer-readable medium of claim 17, wherein generating an enterprise process graph representing the implementation of RPA based on the sets of the one or more event tables comprises:
   generating graphs for the sets of the one or more event tables.

19. The non-transitory computer-readable medium of claim 18, wherein generating an enterprise process graph representing the implementation of RPA based on the sets of the one or more event tables comprises:
   connecting two or more of the graphs.

20. The non-transitory computer-readable medium of claim 17, wherein generating an enterprise process graph representing the implementation of RPA based on the sets of the one or more event tables comprises:
   generating an edge table based on the sets of the one or more event tables; and
   generating the enterprise process graph based on the edge table.

21. The non-transitory computer-readable medium of claim 17, the operations further comprising:
   transmitting the enterprise process graph.

22. The non-transitory computer-readable medium of claim 17, the operations further comprising:
   filtering the enterprise process graph.

23. The non-transitory computer-readable medium of claim 22, the operations further comprising:
   displaying the filtered enterprise process graph.

* * * * *